(12) United States Patent
Wu et al.

(10) Patent No.: US 9,269,288 B2
(45) Date of Patent: Feb. 23, 2016

(54) GENERATING METHOD OF GAMMA VALUE TEST CHART OF DISPLAY DEVICE AND MEASURING METHOD OF GAMMA VALUE THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Xingji Wu, Beijing (CN); Jianming Wang, Beijing (CN); Zhihua Sun, Beijing (CN); Yizhen Xu, Beijing (CN); Liang Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 14/075,108

(22) Filed: Nov. 8, 2013

(65) Prior Publication Data

US 2014/0125674 A1 May 8, 2014

(30) Foreign Application Priority Data

Nov. 8, 2012 (CN) .......................... 2012 1 0443069

(51) Int. Cl.
*G09G 3/00* (2006.01)
*H04N 17/02* (2006.01)
(Continued)

(52) U.S. Cl.
CPC .............. *G09G 3/006* (2013.01); *G09G 3/2074* (2013.01); *H04N 9/69* (2013.01); *H04N 17/02* (2013.01); *H04N 17/04* (2013.01); *G09G 2320/0673* (2013.01)

(58) Field of Classification Search
CPC ...................................................... G06T 11/206
See application file for complete search history.

(56) References Cited

U.S. PATENT DOCUMENTS

| 2006/0132867 | A1* | 6/2006 | Sugiyama et al. ............ 358/504 |
| 2007/0109245 | A1* | 5/2007 | Hwang ........................... 345/98 |

(Continued)

FOREIGN PATENT DOCUMENTS

CN          101937634 A         1/2011

OTHER PUBLICATIONS

Second Office Action issued by the State Intellectual Property Office ("SIPO") on Mar. 13, 2015 for International Application No. 201210443069.2, 4pages.

(Continued)

*Primary Examiner* — Joni Richer
*Assistant Examiner* — Grace Q Li
(74) *Attorney, Agent, or Firm* — Ladas & Parry LLP

(57) ABSTRACT

The present disclosure provides a method for generating a test chart for Gamma value of a display device and a method for testing Gamma value thereof. The method includes: determining a grayscale corresponding to a generated test chart for Gamma value of the display device, and determining luminance of a standard picture area represented by the test chart for Gamma value of the display device; determining a grayscale voltage of a test picture area according to the grayscale corresponding to the standard picture area in the display panel, and determining the luminance of the test picture area displayed by the display panel under the grayscale voltage; comparing the luminance of the test picture area and the luminance of the standard picture area, and determining the Gamma value of the display device according to the result of the comparison.

10 Claims, 3 Drawing Sheets

(51) Int. Cl.
  *H04N 17/04* (2006.01)
  *H04N 9/69* (2006.01)
  *G09G 3/20* (2006.01)

(56) References Cited

U.S. PATENT DOCUMENTS

2008/0158121 A1* 7/2008 Liu et al. .......................... 345/89
2011/0057944 A1* 3/2011 Wang ............................. 345/589
2013/0141409 A1* 6/2013 Kosei ............................. 345/207

OTHER PUBLICATIONS

English Translation of second Office Action issued by SIPO (listed above) for International Application No. 2012104430691, 2 pages.
First Office Action issued by the State Intellectual Property Office ("SIPO") on Nov. 27, 2014 for International Application No. 201210443069.2, 5 pages.
English Translation of first Office Action issued by SIPO (listed above) for International Application No. 2012104430691, 4 pages.
English abstract of CN101937634A, listed above, 1 page.

* cited by examiner

GENERATING METHOD OF GAMMA VALUE TEST CHART OF DISPLAY DEVICE AND MEASURING METHOD OF GAMMA VALUE THEREOF

CROSS REFERENCE TO RELATED APPLICATIONS

This application claims priority from Chinese National Application No. 201210443069.2 filed on Nov. 8, 2012, the contents of which are incorporated herein by reference.

TECHNICAL FIELD OF THE DISCLOSURE

The present disclosure relates to a technical filed of a display device test, and in particular to a method for generating a test chart for Gamma value of a display device and a method for measuring Gamma value of a display device.

BACKGROUND

Gamma value is an important parameter of a display device to characterize a non-linear relationship between luminance of an image displayed on the display device and an input signal voltage. For a display device, the luminance of the image displayed on the display device varies exponentially with the input signal voltage, resulting that a dark area in the displayed image is darker than that in an actual image and a bright area in the displayed image is brighter than that in the actual image, that is to say, the display device performs compression on the dark area of the actual image and extension on the bright area of the actual image.

Similarly, the human eyes' sensitivity to different luminance of the light is also non-linear, but the human eyes' sensitivity is high to the low luminance and is low to the high luminance, that is to say, the human eyes perform extension on the dark area of a actual scene and compression on the bright area of the actual scene, which exactly is opposite to the luminance response of the display device to the actual image. Therefore, Gamma curve (a curve to which Gamma value corresponds) of the display device can be adjusted to conform to the standard for Gamma 2.2 curve, the luminance of the image displayed by the display device which conforms to such a standard will be linearly perceived in the human eyes approximately, and thus a better display effect can be obtained.

In the prior art, in order to test whether Gamma curve of a display device manufactured conforms to the standard for Gamma 2.2 curve, a special optical equipment (for example, color analyzer) is adopted to test the luminance value output from the display device under each of grayscale voltages, a curve formed by a plurality of pairs of input grayscale voltages and output luminance values on a coordinate plane is compared with the Gamma 2.2 curve, and a reference voltage of the display device is adjusted when the curve thus formed does not conform to the standard for Gamma 2.2 curve, such that the Gamma curve of the display device conforms to the standard for the Gamma 2.2 curve. However, in the prior art, it needs a special optical equipment to be used to test the Gamma curve of the display device by means of the above method for measuring the Gamma value of the display device, so the above method for measuring the Gamma value of the display device is complicated and the test efficiency is low.

SUMMARY

Embodiments of the present disclosure provides a method for generating a test chart for Gamma value of a display device and a method for measuring Gamma value of a display device, for solving the problem that the method in the prior art for measuring the Gamma value of the display device is complicated and the test efficiency is low.

In an embodiment of the present disclosure, a method for generating a test chart for Gamma value of a display device including:

generating a standard picture area formed by N pixel units on a display panel by a signal generator, so as to obtain a test chart for Gamma value;

wherein $i^{th}$ pixel unit ($1 \leq i \leq N$) includes $M_i$ sub-pixel units which include $K_i$ sub-pixel units with a grayscale of 0 and $M_i$-$K_i$ sub-pixel units with a grayscale of 255, $M_i$ and N are positive integers greater than 1, $K_i$ is a positive integer not lower than 1 and not greater than $M_i$, all or some of the respective numbers $M_i$ of the sub-pixel units included in each of pixel units forming the standard picture area are equal, or are different from each other, all or some of the respective numbers $K_i$ of the sub-pixel units with the grayscale of 0 included in each of pixel units forming the standard picture area are equal, or are different from each other, and in at least one pixel unit comprised in the standard picture area, the number $M_i$ of the sub-pixel units included therein is different from the number $K_i$ of the sub-pixel units with the grayscale of 0 included therein.

According to another embodiment of the present disclosure, there is provided a method for testing Gamma value of a display device including:

using the above method for generating a test chart for Gamma value of a display device to generate a test chart for Gamma value of a display device, determining a grayscale corresponding to the generated test chart for Gamma value of the display device, and determining luminance of a standard picture area represented by the test chart for Gamma value of the display device corresponding to the grayscale;

comparing the luminance of the test picture area and the luminance of the standard picture area, and determining Gamma value of the display device according to the result of the comparison;

or determining the grayscale of a test picture area according to the grayscale voltage of the test picture area in the display panel and determining the luminance of the test picture area displayed by the display panel under the control of the grayscale voltage;

using the above method for generating a test chart for Gamma value of a display device to generate a test chart for Gamma value of the display device with a same grayscale with the test picture area, and determining the luminance of the standard picture area represented by the test chart for Gamma value of the display device;

comparing the luminance of the test picture area and the luminance of the standard picture area, and determining Gamma value of the display device according to the result of the comparison.

According to the technical solution of the embodiments of the present disclosure, a comparison is made between the luminance of the standard picture area represented by the generated test chart for Gamma value of the display device and the luminance of the test picture area, and thus a test result is obtained. Therefore, the technical solution of the embodiments of the present disclosure can be suitable not only for obtaining a test result by adopting a special test equipment (for example, a color analyzer), but also for obtaining a test result by the naked eyes, and has advantages of fast response, convenient, accurate test results and so on.

BRIEF DESCRIPTION OF THE DRAWINGS

In order to more clearly describe the technical solutions of the embodiments of the present disclosure or the prior art, drawings necessary for describing the embodiments of the present disclosure or the prior art are simply introduced as follows. It should be obvious for those skilled in the art that the drawings described as follows are only some embodiments of the present disclosure and other drawings can be obtained according to these drawings without paying any inventive efforts.

DETAILED DESCRIPTION

In order to ensure of layering of an image, there may be G stages of grayscales between the brightest and darkest gay scales displayed by a display device, and luminance of each of grayscales is determined by the stage of the grayscale and a Gamma value. Generally, G is set as 256, a grayscale of 0 represents the darkest grayscale (black) and a grayscale of 255 represents the brightest grayscale (white).

In order to clearly illustrate the technical solution of the present disclosure, a description will be given below to a standard Gamma 2.2 curve.

Figure 1:
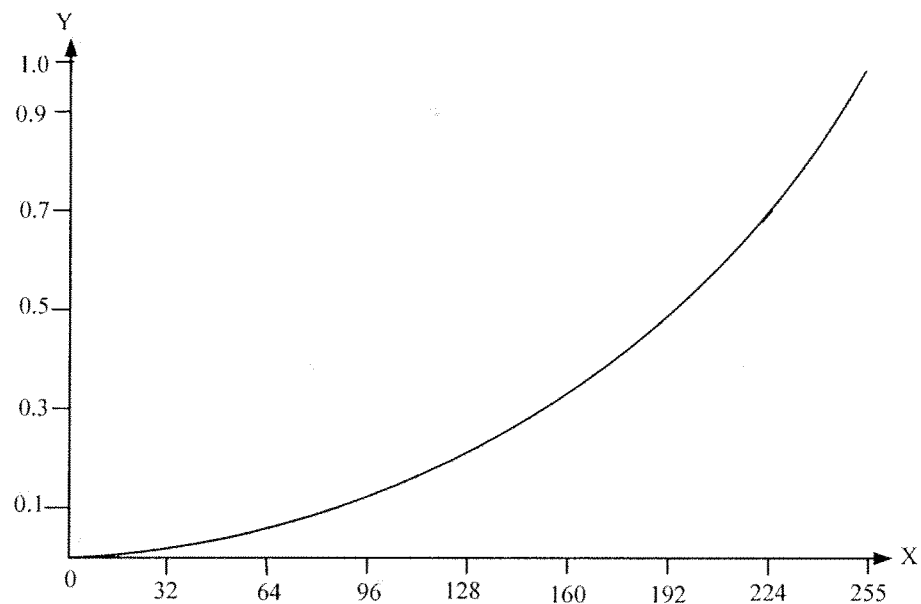
FIG. 1 is a schematic diagram of a standard Gamma 2.2 curve of embodiments of the present disclosure.

In FIG. 1, a schematic diagram of the standard Gamma 2.2 curve is shown, X-axis in FIG. 1 represents grayscale L (which ranges from 0~255), Y-axis in FIG. 1 represents transmittance of the display device (that is, normalized luminance), the function expression of the Gamma 2.2 curve is $Y=(L/255)^{2.2}$, wherein each of the grayscales L corresponds to a grayscale voltage.

When the Gamma curve of the display device meets the requirements of the Gamma 2.2 curve, the display device may have a good display effect for luminance of the displayed image, that is to say, the grayscale distribution of the displayed image is even in human's eyes. When the Gamma curve of the display device does not conform to the requirements of the Gamma 2.2 curve, the display device may have a poor display effect for luminance of the displayed image, that is to say, the grayscale distribution of the displayed image is uneven in human's eyes.

It should be noted that, ends of Gamma curve of a display device remain unchanged, that is to say, regardless of the variation of the Gamma value, the transmittance corresponding to the grayscale of 0 is always 0 and the transmittance corresponding to the grayscale of 255 is always 1. In other words, no matter whether Gamma value of a display device is 2.2, the transmittance corresponding to the grayscale of 0 (black) is always 0 and the transmittance corresponding to the grayscale of 255 (write) is always 1 in the display device, so that a test chart can be designed by using the characteristics of the transmittance of the grayscale of 0 and the transmittance of the grayscale of 255 for testing Gamma value of the display device.

In order to make Gamma curve of a display device conform to the requirements of the Gamma 2.2 curve, a test is required to be performed on luminance of the display device under different grayscales, luminance thus obtained is normalized and compared with the transmittance corresponding to the grayscale in the Gamma 2.2 curve, and it is determined that the Gamma value of the display device under the grayscale is 2.2 when the comparison shows that the normalized luminance is equal to the transmittance in the Gamma 2.2 curve under the grayscale.

Detailed descriptions will be made below to the embodiments of the present disclosure with reference to the accompanying drawings.

First Embodiment

In the embodiment, there is provided a method for generating a test chart for Gamma value of a display device including: generating a standard picture area formed by N pixel units on a display panel by a signal generator, so as to obtain a test chart for Gamma value; wherein $i^{th}$ pixel unit ($1 \le i \le N$) includes $M_i$ sub-pixel units, which include $K_i$ sub-pixel units with a grayscale of 0 and $M_i$-$K_i$ sub-pixel units with a grayscale of 255, $M_i$ and N are positive integers greater than 1, $K_i$ is a positive integer not lower than 1 and not greater than $M_i$, all or some of the respective numbers $M_i$ of the sub-pixel units included in each of pixel units constituting the standard picture area are equal, or all of them are different from each other, and all or some of the respective numbers $K_i$ of the sub-pixel units with the grayscale of 0 included in each of pixel units are equal, or all of them are different from each other, and in at least one pixel unit in the standard picture area, the number $M_i$ of the sub-pixel units included therein is different from the number $K_i$ of the sub-pixel units with the grayscale of 0 included therein.

The value of N is determined by size of the standard picture area and the number of the sub-pixel units included in each of the pixel units, that is to say, the above constituted standard picture area is filled up by respective pixel units.

For example, when the standard picture area has a size of 128*128 pixels, it can include 9 pixel units each of which has a size of 32*32 pixels, 3 pixel units each of which has a size of 64*32 pixels, and 64 pixel units each of which has a size of 4*4 pixels.

When all of the respective numbers $M_i$ of the sub-pixel units included in each of pixel units constituting the standard picture area are equal, the pixel unit can be used as a minimum repeated unit to fill up the whole standard picture area.

If the test chart for Gamma value of the display device is generated as above, it will disappear when the display device is powered off and/or the signal generator is not in operation.

In the technical solution of generating the test chart for Gamma value of the display device according to the first embodiment of the present disclosure, the principles that ends of the Gamma curve of the display device remain unchanged and the human eyes' sensitivity to the luminance difference among the sub-pixel units is low are used, detailed descriptions will be given below by taking the case that all of the respective numbers $M_i$ of the sub-pixel units included in each of pixel units constituting the standard picture area are equal (for example, $M_i=M$) and all of the respective numbers $K_i$ of the sub-pixel units with the grayscale of 0 included in each of pixel units constituting the standard picture area are equal (for example, $K_i=K$) as an example.

The transmittance of the sub-pixel unit with a grayscale of 0 is 0, the transmittance of the sub-pixel unit with a grayscale of 255 is 1 (that is, total light transmittance), for a pixel unit including M-K sub-pixel units with the grayscale of 255 and K sub-pixel units with the grayscale of 0, one pixel unit will be treated as a whole by the human eyes since the sub-pixel unit is small, and thus a ratio (i.e., transmittance) of the luminance of the pixel unit to the maximum luminance of the display device is equivalent to (M-K)/M, when the pixel unit is displayed on the display device. For the test chart for Gamma value of the display device constituted by N pixel units, a ratio (that is, transmittance) of the luminance of the standard picture area represented to the maximum luminance of the display device is also equivalent to (M-K)/M, and then the grayscale corresponding to the transmittance can be obtained according to the standard Gamma 2.2 curve. Thereafter, the grayscale voltage of the display device can be adjusted to the grayscale voltage corresponding to the grayscale, the luminance of the test picture displayed on the display device under the grayscale voltage is compared to the luminance of the standard picture represented by the test chart for Gamma value of the display device, and it can be known whether the Gamma value of the display device under the grayscale is equal to 2.2 or not according to the result of the comparison, thereby achieving the purpose of testing Gamma value of the display device.

Although the human eyes are less sensitive to the luminance difference of the sub-pixel units, the human eyes may perceive the luminance difference among the sub-pixel units when the sub-pixel units with a grayscale of 0 or 255 form a continuous part with increase of the number of the sub-pixel units in each of the pixel units. Optionally, M is set as 4.

Optionally, when M is set as 4, each pixel unit includes an arrangement of 2*2 formed by 4 sub-pixel units.

Figure 2:
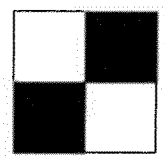
FIG. 2 is a schematic structure diagram of a diagonal arrangement of a sub-pixel unit in a first embodiment of the present disclosure.

Optionally, in order to make the standard picture area represented by the test chart for Gamma value of the display device reflect accurately the luminance displayed on the display device by the grayscale corresponding thereto, when all of the respective numbers $M_i$ of the sub-pixel units included in each of pixel units constituting the standard picture area are equal to 4, the number $K_i$ of the sub-pixel units with the grayscale of 0 included in each of the pixel units is equal to 2, and the two sub-pixel units with the grayscale of 0 included in each of the pixel units form a diagonal arrangement. At this time, the configuration of the pixel unit is shown in FIG. 2, wherein the black blocks represent the sub-pixel units with the grayscale of 0 and the white blocks represent the sub-pixel units with the grayscale of 255.

The method for generating a test chart for Gamma value of a display device is described in the first embodiment, and a method for testing Gamma value of a display device by using the generated test chart for Gamma value of the display device will be described in a second embodiment.

Second Embodiment

Figure 3:
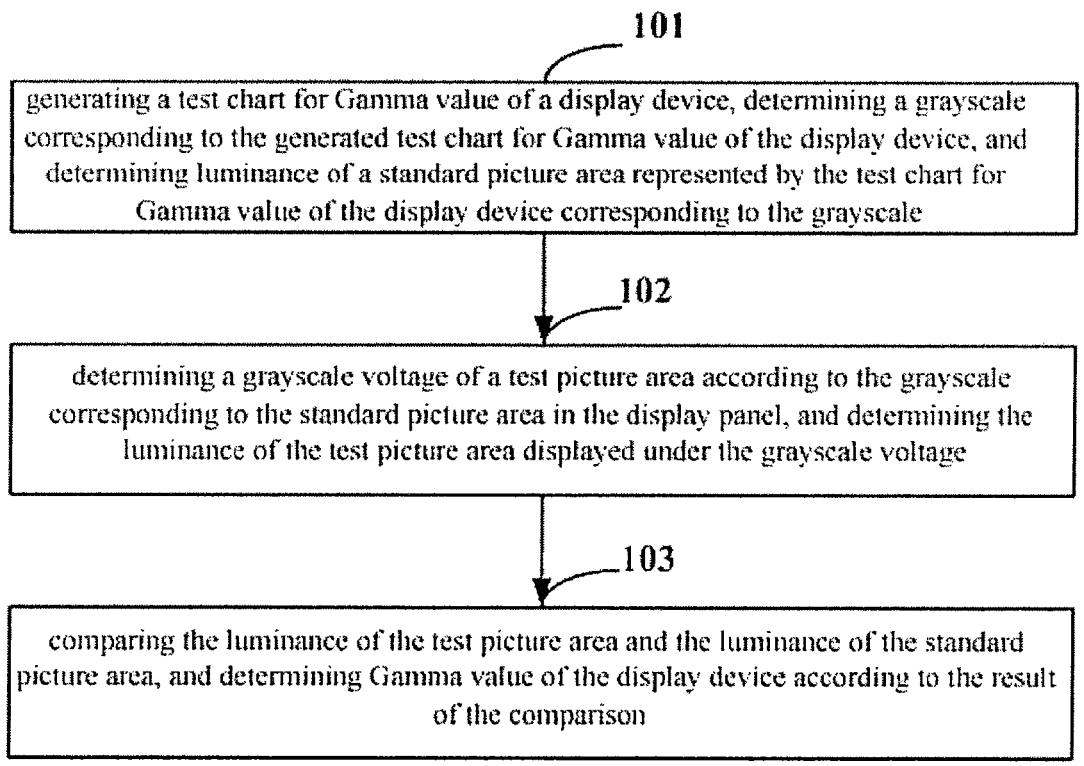
FIG. 3 is a flowchart of a method for testing Gamma value of a display device in a second embodiment of the present disclosure.

As shown in FIG. 3, a schematic flowchart of a method for testing Gamma value of a display device is provided in the second embodiment of the present disclosure, the method includes the following steps.

At step 101, a test chart for Gamma value of a display device is generated by using the method for generating a test chart for Gamma value of a display device as described in the first embodiment of the present disclosure, and a grayscale corresponding to the generated test chart for Gamma value of the display device is determined, luminance of a standard picture area represented by the test chart for Gamma value of the display device under the grayscale is determined.

Particularly, the luminance of the standard picture area can be tested by adopting a special optical equipment or can be perceived by the naked eyes.

Optionally, the grayscale corresponding to the generated test chart for Gamma value of the display device can be determined in the following manner:

the grayscale L corresponding to the generated test chart for Gamma value of the display device is determined according to the number $M_i$ of the sub-pixel units included in each of the pixel units in the generated test chart for Gamma value of the display device and the number $K_i$ of the sub-pixel units with the grayscale of 0 included in each of the pixel units in the generated test chart for Gamma value of the display device.

Particularly, all of the numbers determined as above can be accumulated to $M_{all}$, all of the numbers $K_i$ determined as above can be accumulated to $K_{all}$, and the grayscale L corresponding to the generated test chart for Gamma value of the display device can be determined according to the following equation (1).

$$L = \left\lfloor 255 \times \sqrt[2.2]{\frac{M_{all} - K_{all}}{M_{all}}} \right\rfloor \text{ or } L = \left\lceil 255 \times \sqrt[2.2]{\frac{M_{all} - K_{all}}{M_{all}}} \right\rceil \quad (1)$$

Optionally, all of the respective numbers $M_i$ of the sub-pixel units included in each of pixel units constituting the standard picture area are equal, for example, $M_i=M$, and all of the respective numbers $K_i$ of the sub-pixel units with the grayscale of 0 included in each of pixel units constituting the standard picture area are equal, for example, $K_i=K$, and the grayscale L corresponding to the generated test chart for Gamma value of the display device can be determined according to the following equation (2).

$$L = \left\lfloor 255 \times \sqrt[2.2]{\frac{M - K}{M}} \right\rfloor \text{ or } L = \left\lceil 255 \times \sqrt[2.2]{\frac{M - K}{M}} \right\rceil \quad (2)$$

It should be noted that the grayscale L obtained according to the above equation (1) is not necessarily to be a positive integer, and what needs to be done is to round the grayscale L upward or downward. For example, provided that the obtained grayscale value L may be 136.73, and is rounded upward to 137 or rounded downward to 136.

At step 102, a grayscale voltage of a test picture area is determined according to the grayscale corresponding to the standard picture area in the display panel, and the luminance of the test picture area displayed by the display panel under the grayscale voltage is determined.

Particularly, the luminance of the test picture area can be detected by adopting special optical equipments or can be perceived by the naked eyes.

In the display device, there is a correspondence relationship between the grayscale and the grayscale voltage, and the grayscale voltage of the test picture area can be determined according to the correspondence relationship after the grayscale corresponding to the standard picture area is determined.

At step 103, the luminance of the test picture area is compared with the luminance of the standard picture area, and the Gamma value of the display device is determined according to the result of the comparison.

Particularly, the Gamma value of the display device can be determined according to the result of the comparison in the following manner.

When the luminance of the test picture area is the same as that of the standard picture area, it is determined that the Gamma value of the display device is 2.2;

when the luminance of the test picture area is greater than that of the standard picture area, it is determined that the Gamma value of the display device is lower than 2.2;

when the luminance of the test picture area is lower than that of the standard picture area, it is determined that the Gamma value of the display device is greater than 2.2.

In the step 103, the luminance of the standard picture area tested by an optical equipment in the step 101 and the luminance of the test picture area tested by the optical equipment in the step 102 are compared with each other, or the luminance of the standard picture area perceived by the naked eyes in the step 101 and the luminance of the test picture area perceived by the naked eyes in the step 102 are compared with each other.

Figure 4:
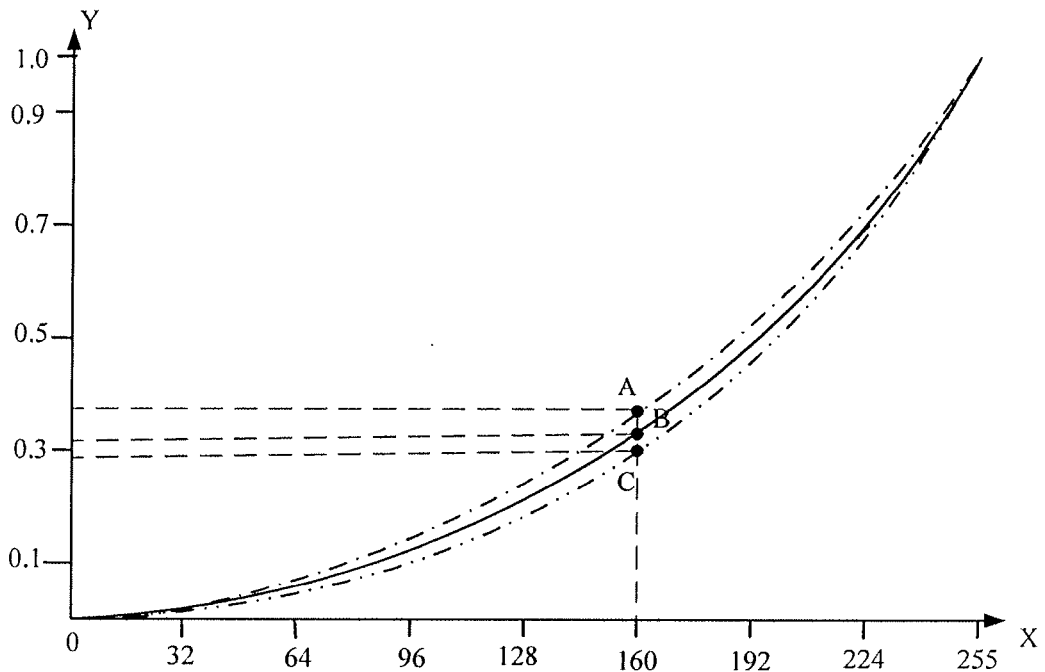
FIG. 4 is a schematic diagram of three Gamma curves having different Gamma value in the second embodiment of the present disclosure.

The conclusion obtained from the above comparison can be seen from the three Gamma curves having different Gamma values shown in FIG. 4, wherein the solid line represents the Gamma 2.2 curve, the dash-dotted line represents the Gamma 2.0 curve, and the double-dot line represents the Gamma 2.4 curve. If a vertical line is drawn at a grayscale of 160 towards the three Gamma curves, the intersection of the vertical line and the Gamma 2.0 curve is represented by point A, the intersection of the vertical line and the Gamma 2.2 curve is represented by point B, and the intersection of the vertical line and the Gamma 2.4 curve is represented by point C. At this time, the transmittance corresponding to the point A is greater than the transmittance corresponding to the point B, and the transmittance corresponding to the point C is lower than the transmittance corresponding to the point B.

It should be noted that, the above test method is not limited to the case in which there are only one test picture area and only one standard picture area in the display panel and a plurality of standard picture areas may be generated simultaneously at different positions on a same display panel by using the method for generating a test chart for Gamma value of a display device according to the first embodiment of the present disclosure, wherein the plurality of standard picture area correspond to different grayscales respectively. Meanwhile, the grayscale corresponding to a standard picture area is the same as the grayscale of the test picture area corresponding to the standard picture area.

Meanwhile, in order to expedite the test for the Gamma values of the display device under different grayscales, a standard picture area can be generated on the display panel which is constituted by the pixel units each of which includes a same number of sub-pixel units and has a same arrangement of sub-pixel units.

Figure 5:
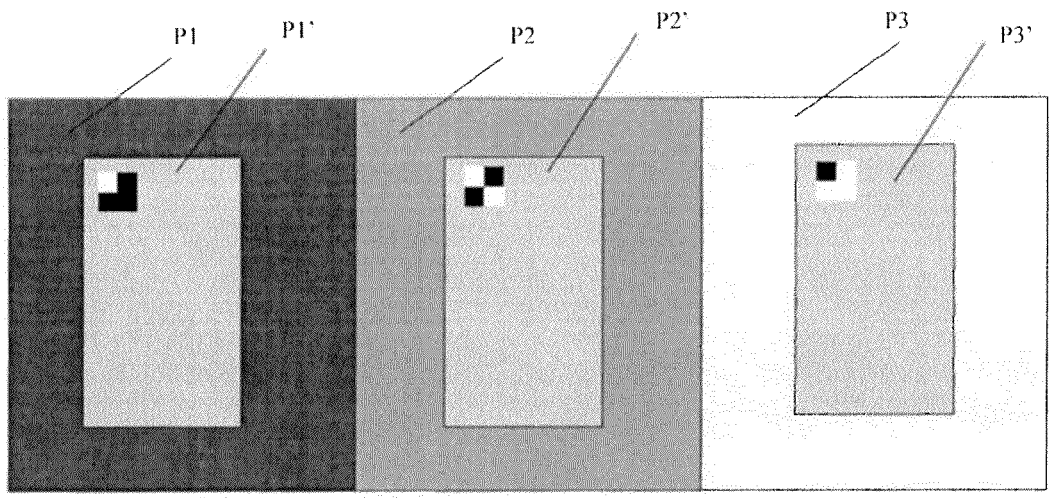
FIG. 5 is a schematic diagram of respective test picture areas and the standard picture area in the display device in the second embodiment of the present disclosure.

For example, it is assumed that the number $M_i$ of the sub-pixel units included in each of the pixel units is 4, the arrangement of the pixel unit is 2*2, and the two sub-pixel units with the grayscale of 0 included in the pixel unit have a diagonal arrangement, the respective test picture areas and the respective standard picture areas presented in the display device can be as shown in FIG. 5 (for sake of schematic illustration, only one magnified pixel unit from the standard picture area is shown in FIG. 5).

As shown in FIG. 5, P1' represents a standard picture area corresponding to the grayscale of 136, P1 represents a test picture area corresponding to the grayscale of 136; P2' represents a standard picture area corresponding to the grayscale of 187, P2 represents a test picture area corresponding to the grayscale of 187; P3' represents a standard picture area corresponding to the grayscale of 223, P3 represents a test picture area corresponding to the grayscale of 223. The black blocks in FIG. 5 represent the sub-pixel units with the grayscale of 0 and the write blocks in FIG. 5 represent the sub-pixel units with the grayscale of 255.

In the second embodiment of the present disclosure, the luminance of the standard picture area presented in the display panel is used as a criterion, wherein the standard picture area is represented by the test chart for Gamma value of the display device, the luminance of the standard picture area and the luminance of the test picture area displayed in the display device having the same grayscale as the standard picture area are compared, such that it can be known whether the Gamma value of the display device under the grayscale conforms to the standard Gamma 2.2 curve. Therefore, it can be easily and accurately determined whether the Gamma value of the display device conforms to the standard Gamma 2.2 curve by optical equipments or the naked eyes.

Third Embodiment

Figure 6:
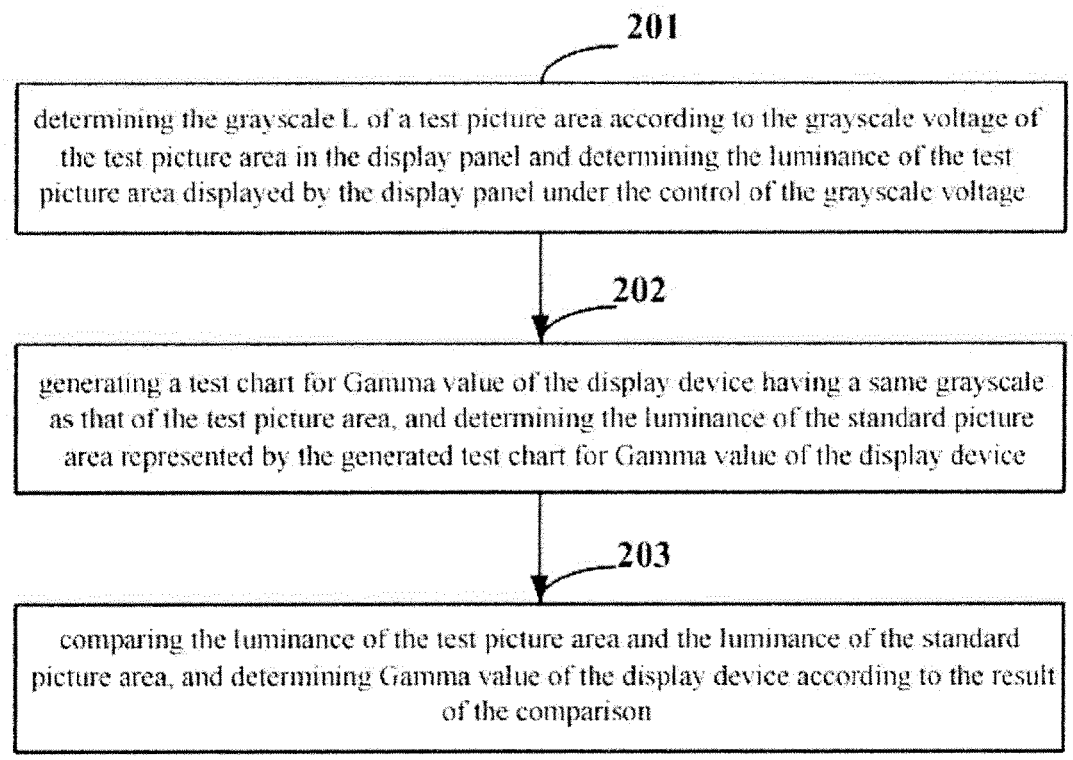
FIG. 6 is a flowchart of a method for testing Gamma value of a display device of a third embodiment of the present disclosure.

In FIG. 6, a method for testing Gamma value by using a generated test chart for Gamma value of a display device is shown and includes the following steps.

At step 201, a grayscale L of the test picture area is determined according to grayscale voltage of the test picture area in the display panel, and luminance of the test picture area displayed on the display panel under the control of the grayscale voltage corresponding to the grayscale L is determined.

At step 202, a test chart for Gamma value of a display device corresponding to the grayscale L which is the same as the grayscale of the test picture area is generated by using the method of the first embodiment, and the luminance of the standard picture area represented by the generated test chart for Gamma value of the display device is determined.

Optionally, in the step 202, all of the respective numbers $M_i$ of the sub-pixel units included in each of pixel units constituting the standard picture area are equal (for example, $M_i=M$), all of the respective numbers $K_i$ of the sub-pixel units with the grayscale of 0 included in each of pixel units constituting the standard picture area are equal (for example, $K_i=K$), and a test chart for Gamma value of a display device corresponding to the grayscale L which is the same as the grayscale of the test picture area is generated by using the method of the first embodiment in the following manner.

At a first step, M and K satisfying the relationship of $$\frac{M-K}{M} = \left(\frac{L}{255}\right)^{2.2}$$

are determined.

It should be noted that, in the first step, the determined M and K are not necessarily to be positive integers, and can be rounded upward or downward to obtain M and K being positive integers.

At a second step, a test chart for Gamma value of a display device is generated by using the method of the first embodiment according to the determined M and K.

Optionally, when the determined M is equal to 4, 4 sub-pixel units included in each of the pixel units form a 2*2 arrangement.

Optionally, when the determined M is equal to 4 and the determined K is equal to 2, 4 sub-pixel units included in each of the pixel units form a 2*2 arrangement and 2 sub-pixel units with the grayscale of 0 included in each of the pixel units form a diagonal arrangement.

At step 203, the luminance of the test picture area and the luminance of the standard picture area are compared, so that the Gamma value of the display device is determined according to the result of the comparison.

Particularly, the Gamma value of the display device is determined according to the result of the comparison in the following manner.

When the luminance of the test picture area is the same as that of the standard picture area, it is determined that the Gamma value of the display device is 2.2;

when the luminance of the test picture area is greater than that of the standard picture area, it is determined that the Gamma value of the display device is lower than 2.2; and when the luminance of the test picture area is lower than that of the standard picture area, it is determined that the Gamma value of the display device is greater than 2.2.

The difference between the technical solution of the second embodiment and the technical solution of the third embodiment lies in that the test chart for Gamma value of the display device is generated firstly and the grayscale of the test picture area is then determined according to the generated test chart for Gamma value of the display device in the second embodiment, and in the third embodiment, the grayscale of the test picture area is determined firstly and the test chart for Gamma value of the display device is then generated according to the grayscale of the test picture area. The technical solution of the second embodiment and that of the third embodiment are based on the same principle of measuring, and for the particular implementation of the third embodiment, please refer to that of the second embodiment, detailed descriptions are omitted herein.

The above descriptions are only for illustrating the embodiments of the present disclosure, and in no way limit the scope of the present disclosure. It will be obvious that those skilled in the art may make modifications, variations and equivalences to the above embodiments without departing from the spirit and scope of the present disclosure as defined by the following claims. Such variations and modifications are intended to be included within the spirit and scope of the present disclosure.

What is claimed is:

1. A method for testing Gamma value of a display device comprising:
    generating a test chart for Gamma value of the display device by generating a standard picture area formed by N pixel units on a display panel of the display device by a signal generator,
    determining a grayscale corresponding to the generated test chart for Gamma value of the display device, and determining luminance of a standard picture area represented by the test chart for Gamma value of the display device corresponding to the grayscale;
    determining a grayscale voltage of a test picture area according to the grayscale corresponding to the standard picture area in the display panel, and determining the luminance of the test picture area displayed by the display panel under the grayscale voltage;
    comparing the luminance of the test picture area and the luminance of the standard picture area, and determining the Gamma value of the display device according to a result of the comparison;
    or
    determining the grayscale of a test picture area according to the grayscale voltage of the test picture area in the display panel and determining the luminance of the test picture area displayed by the display panel under the control of the grayscale voltage;
    generating a test chart for Gamma value of the display device corresponding to the grayscale which is the same as the grayscale of the test picture area by generating a standard picture area formed by N pixel units on a display panel of the display device by a signal generator, and determining the luminance of the standard picture area represented by the generated test chart for Gamma value of the display device;
    comparing the luminance of the test picture area and the luminance of the standard picture area, and determining Gamma value of the display device according to a result of the comparison;
    wherein $i^{th}$ pixel unit ($1 \leq i \leq N$) of the N pixel units comprises $M_i$ sub-pixel units comprising $K_i$ sub-pixel units with a grayscale of 0 and $M_i - K_i$ sub-pixel units with a grayscale of 255, $M_i$ and N are positive integers greater than 1, $K_i$ is a positive integer not lower than 1 and not greater than $M_i$, all or some of respective numbers $M_i$ of the sub-pixel units comprised in each of the pixel units forming the standard picture area are equal, or are different from each other, all or some of respective numbers $K_i$ of the sub-pixel units with the grayscale of 0 comprised in each of pixel units forming the standard picture area are equal, or are different from each other, and in at least one pixel unit comprised in the standard picture area, the number $M_i$ of the sub-pixel units included therein is different from the number $K_i$ of the sub-pixel units with the grayscale of 0 included therein.

2. The method of claim 1, wherein the Gamma value of the display device is determined according to the result of the comparison in the following manner:
    when the luminance of the test picture area is equal to that of the standard picture area, it is determined that the Gamma value of the display device is 2.2;
    when the luminance of the test picture area is greater than that of the standard picture area, it is determined that the Gamma value of the display device is lower than 2.2; and
    when the luminance of the test picture area is lower than that of the standard picture area, it is determined that the Gamma value of the display device is greater than 2.2.

3. The method of claim 2, wherein all of the respective numbers $M_i$ of the sub-pixel units comprised in each of pixel units forming the standard picture area are equal, $M_i = M$, all of the respective numbers $K_i$ of the sub-pixel units with the grayscale of 0 comprised in each of the pixel units are equal $K_i = K$, and the grayscale L corresponding to the generated test chart for Gamma value of the display device is determined according to the following equation:

$$L = \left\lceil 255 \times \sqrt[2.2]{\frac{M-K}{M}} \right\rceil \text{ or } L = \left\lfloor 255 \times \sqrt[2.2]{\frac{M-K}{M}} \right\rfloor$$

wherein L is a positive integer greater than 0 and lower than 255.

4. The method of claim 3, wherein when the determined M is equal to 4, 4 sub-pixel units comprised in each of the pixel units form a 2*2 arrangement.

5. The method of claim 4, wherein when the number K of the sub-pixel units with the grayscale of 0 comprised in each of the pixel units is equal to 2, 2 sub-pixel units with the grayscale of 0 comprised in each of the pixel units form a diagonal arrangement.

6. The method of claim 2, wherein all of the respective numbers $M_i$ of the sub-pixel units comprised in each of pixel units forming the standard picture area are equal, $M_i=M$, all of the respective numbers K of the sub-pixel units with the grayscale of 0 comprised in each of the pixel units are equal, $K_i=K$, and the test chart for Gamma value of the display device corresponding to the grayscale L which is same as that of the test picture area is generated by the following steps:

determining M and K satisfying the relationship of $$\frac{M-K}{M} = \left(\frac{L}{255}\right)^{2.2};$$

generating the test chart for Gamma value of the display device according to the determined M and K.

7. The method of claim 6, wherein when the determined M is equal to 4, 4 sub-pixel units comprised in each of the pixel units form a 2*2 arrangement.

8. The method of claim 7, wherein when the number K of the sub-pixel units with the grayscale of 0 comprised in each of the pixel units is equal to 2, 2 sub-pixel units with the grayscale of 0 comprised in each of the pixel units form a diagonal arrangement.

9. The method of claim 1, wherein when all of the respective numbers $M_i$ of the sub-pixel units comprised in each of the pixel units forming the standard picture area are equal to 4, 4 sub-pixel units comprised in each of the pixel units form a 2*2 arrangement.

10. The method of claim 9, wherein when all of the respective numbers $K_i$ of the sub-pixel units with the grayscale of 0 comprised in each of the pixel units are equal to 2, 2 sub-pixel units with the grayscale of 0 comprised in each of the pixel units form a diagonal arrangement.

* * * * *